US012749441B2

(12) United States Patent
Chen et al.

(10) Patent No.: US 12,749,441 B2
(45) Date of Patent: Sep. 29, 2026

(54) DISPLAY DRIVING METHOD AND DISPLAY APPARATUS

(71) Applicant: JADARD TECHNOLOGY INC., Shenzhen (CN)

(72) Inventors: Chih-Chang Chen, New Taipei (TW); Chih-Ting Chen, New Taipei (TW); Hon-Yuan Leo, New Taipei (TW)

(73) Assignee: JADARD TECHNOLOGY INC., Shenzhen (CN)

( * ) Notice: Subject to any disclaimer, the term of this patent is extended or adjusted under 35 U.S.C. 154(b) by 0 days.

(21) Appl. No.: 19/036,206

(22) Filed: Jan. 24, 2025

(65) Prior Publication Data

US 2026/0162598 A1 Jun. 11, 2026

(30) Foreign Application Priority Data

Dec. 6, 2024 (CN) ........................ 202411803139.X

(51) Int. Cl.
*G09G 3/3208* (2016.01)

(52) U.S. Cl.
CPC ..... *G09G 3/3208* (2013.01); *G09G 2300/043* (2013.01); *G09G 2320/0233* (2013.01); *G09G 2320/0686* (2013.01); *G09G 2330/08* (2013.01); *G09G 2360/16* (2013.01)

(58) Field of Classification Search
CPC ........... G09G 3/3208; G09G 2300/043; G09G 2320/0233; G09G 2320/0686; G09G 2330/08; G09G 2360/16
See application file for complete search history.

(56) References Cited

U.S. PATENT DOCUMENTS 8,711,135 B2 * 4/2014 Lin ...................... G09G 3/3655 345/87
2016/0086542 A1 * 3/2016 Lee ...................... G09G 3/3225 345/212

FOREIGN PATENT DOCUMENTS

CN 114360458 A * 4/2022

* cited by examiner

*Primary Examiner* — Ke Xiao
*Assistant Examiner* — Jennifer L Zubajlo
(74) *Attorney, Agent, or Firm* — ScienBiziP, P.C.

(57) ABSTRACT

A display driving method is used in a display apparatus with a number of data lines and a data driving circuit. The display driving method includes calculates an average brightness of each of the data lines of a display image and calculating an average brightness difference of each of the data lines. When the average brightness difference of the data line is greater than a predefined threshold value, compensation data lines are set. Compensation parameters and trim parameters corresponding to each of the compensation data lines are calculated respectively. An output brightness value of each of the compensation data lines is calculated based on an original brightness value, the calculated compensation parameters, and the calculated trim parameters of each of the compensation data lines and is outputted to a data driving circuit. A display apparatus is also provided.

16 Claims, 7 Drawing Sheets

1

DISPLAY DRIVING METHOD AND DISPLAY APPARATUS

TECHNICAL FIELD

The present application generally relates to display technology, and particularly to a display driving method and a display apparatus.

BACKGROUND

As the development of electronic technology, a display panel is served as an input/output device in a customer electronic, such as a mobile phone, a portable computer, personal digital assistance (PDA), a tablet, and a medium player, for providing a better human-computer interaction manner. A display apparatus generally includes a display panel and a driving circuit for driving the display panel to display images. The types of the display panel include a liquid crystal display (LCD) and an organic light emitting display (OLED). The display panel includes a plurality of data lines and a plurality of scan lines. In the OLED, the driving circuit provides driving voltages generated by an electroluminescent voltage device driver (ELVDD) to the data lines. A coupling defect of the data line exists while there is external interference at the ELVDD. The driving voltages of two adjacent data lines provided by the ELVDD are fluctuated upwardly or downwardly, which cause the display image to be abnormal.

There is room for improvement in the art.

BRIEF DESCRIPTION OF THE DRAWINGS

Implementations of the present application will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

It will be understood that the specific embodiments described herein are merely some embodiments and not all.

In the descriptions of the application, the words such as "first" and "second" are used to distinguish between different objects, and do not limit quantities and execution sequences. In addition, the words such as "first" and "second" do not necessarily limit a definite difference. In addition, terms "include" and "have", and any variant thereof are intended to cover the non-exclusive inclusion.

Unless defined otherwise, all technical and scientific terms used herein have the same meaning as commonly understood by those skilled in the art of the present application. The terms used in the specification of the present application are for the purpose of describing exemplary examples only and are not intended to limit the present application. The terms "and/or" used herein includes any and all combinations of one or more related listed item.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The following describes embodiments of a display driving method and a display apparatus of the application in more detail with reference to the accompanying drawings.

Figure 1:
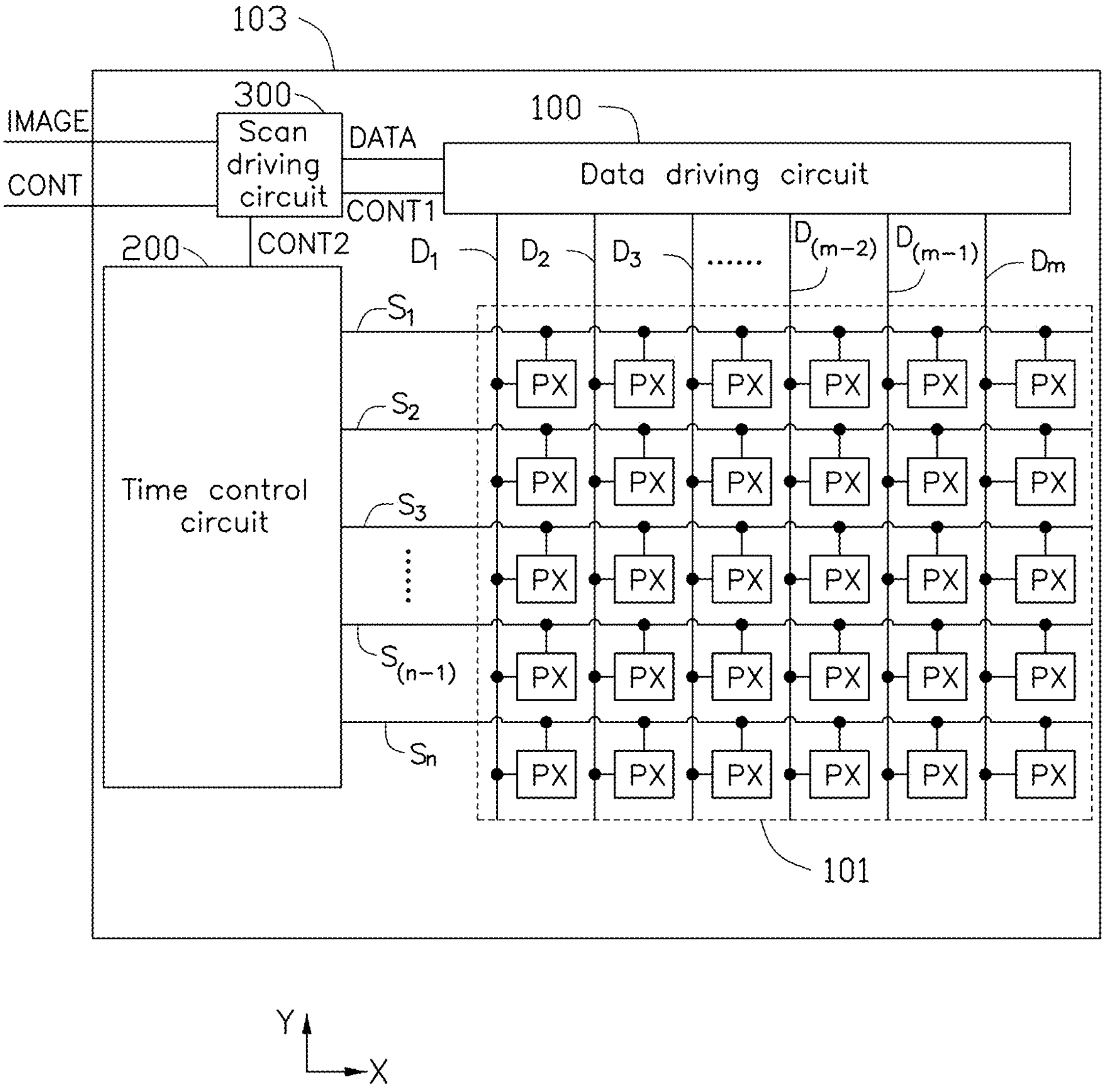
FIG. 1 is a diagram illustrating an embodiment of a display apparatus according to the present application.

Referring to FIG. 1, FIG. 1 shows a display apparatus 1. In one embodiment of the present application, the display apparatus 1 is an organic light emitting diode (OLED) display with a self-luminous structure. The display apparatus 1 defines a display region 101 and a non-display region 103 surrounding the display region 101. The display region 101 includes a number of scan lines $S_1$-$S_n$ and a number of data lines $D_1$-$D_m$. In one embodiment, n and m are positive integers. The scan lines $S_1$-$S_n$ are parallel with each other along a first direction X, and the data lines $D_1$-$D_m$ are parallel with each other along a second direction Y, the second direction Y being perpendicular to the first direction X. The scan lines $S_1$-$S_n$ are insulated from and are intersecting with the data lines $D_1$-$D_m$ to define a number of pixel units PX in a matrix. In one embodiment of the present application, the first direction X is perpendicular to the second direction Y. In other embodiments of the present application, the first direction X may be angled with the second direction Y in other angles.

The display apparatus 1 includes a data driving circuit 100, a scan driving circuit 200, and a time control circuit 300. Each pixel unit PX is electrically connected to the data driving circuit 100 through one of the data lines $D_1$-$D_m$, and is electrically connected to the scan driving circuit 200 through one of the scan lines $S_1$-$S_n$. The time control circuit 300 is electrically connected with the data driving circuit 100 and the scan driving circuit 200. The time control circuit 300 generates a first synchronization control signal CONT1 to the data driving circuit 100 and a second synchronization control signal CONT2 to the scan driving circuit 200 while receiving the input control signal CONT. The time control circuit 300 further generates image data DATA to the data driving circuit 100 while receiving an image IMAGE. The synchronization control signals may include synchronization signals, such as a vertical synchronization (Vsync) signal, a horizontal synchronization (Hsync) signal, and a data enable (DE) signal, and non-synchronization signals.

Figure 2:
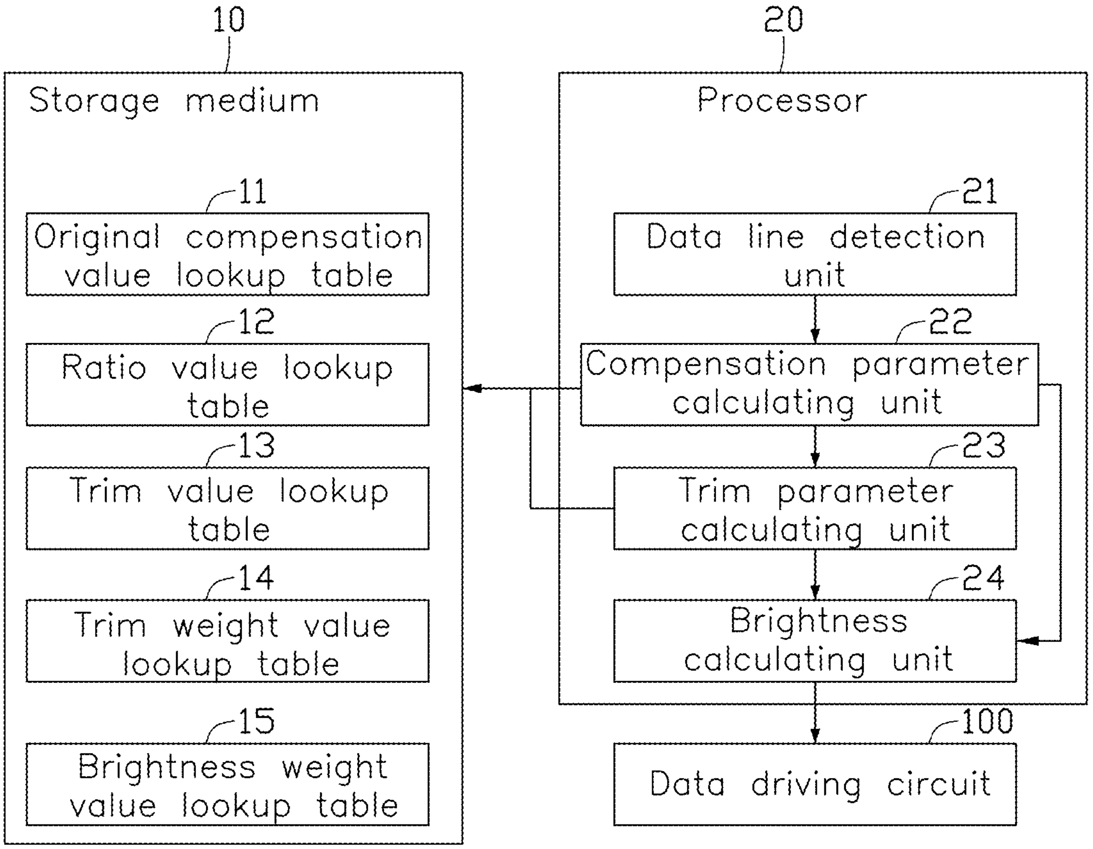
FIG. 2 is another diagram illustrating the embodiment of the display apparatus of FIG. 1 according to the present application.

Referring to FIG. 2, FIG. 2 shows the display apparatus 1. In one embodiment of the present application, the display apparatus 1 further includes a storage medium 10 and a processor 20.

The storage medium 10 may be an internal storage medium of the display apparatus 1, and also may be an external storage medium of the display apparatus 1. In some embodiments, the storage medium 10 is used to store computer programs and various data, and realize high-speed, automatic complete program or data access while the display apparatus 1 operates. The storage medium 10 may include random access memory and may also include non-volatile memory such as a hard disk, memory, a plug-in hard disk, Smart Media Card (SMC), a Secure Digital (SD) card, Flash Card, at least one disk memory device, flash memory device, or other volatile solid state memory device.

The storage medium 10 stores an original compensation value lookup table 11, a ratio value lookup table 12, a trim value lookup table 13, a trim value weight lookup table 14, and a brightness weight value lookup table 15. The original compensation lookup table 11 stores a relationship between different bonding-points of an average brightness difference Delta_avg and original compensation values under different specified conditions. The bonding-point of the average brightness difference Delta_avg is configured to define different brightness compensation intervals. An average brightness difference Delta_avg is a difference of the average brightness of a current data line D(i) and a previous data line D(i−1) in front of the current data line D(i). In one embodiment, the brightness of each of the bonding-points of the average brightness difference Delta_avg is in a range from 0 to 256, and the brightness of adjacent bonding-points of the average brightness difference Delta_avg are set to be an arithmetic series. In the original compensation value lookup table 11, the compensation values in different specified conditions may be different or same. The specified condition includes a color of the current data line D(i) and a brightness change trend between the current data line D(i) and the previous data line D(i−1). For example, as shown in a following original compensation value lookup table 11, in the original competition value lookup table 11, there are twelve bonding-points of the average brightness differences Delta_avg and the original compensation values under the four specified conditions. In other embodiments, the original compensation value lookup table 11 may define more or less bonding-point values of the average brightness differences and specified conditions.

TABLE 11

Original compensation value lookup table

| Bonding-points of Delta_avg | Original compensation value under the specified condition 1 | Original compensation value under the specified condition 2 | Original compensation value under the specified condition 3 | Original compensation value under the specified condition 4 |
|---|---|---|---|---|
| 0 | 6 | 5 | 6 | 5 |
| 16 | 12 | 10 | 12 | 10 |
| 32 | 12 | 11 | 12 | 11 |
| 48 | 8 | 12 | 8 | 12 |
| 64 | 8 | 13 | 8 | 13 |
| 80 | 8 | 15 | 8 | 15 |
| 96 | 8 | 17 | 8 | 17 |
| 112 | 16 | 19 | 16 | 19 |
| 128 | 16 | 24 | 16 | 24 |
| 160 | 12 | 30 | 12 | 30 |
| 192 | 20 | 40 | 20 | 40 |
| 256 | 40 | 50 | 40 | 50 |

Figure 3:
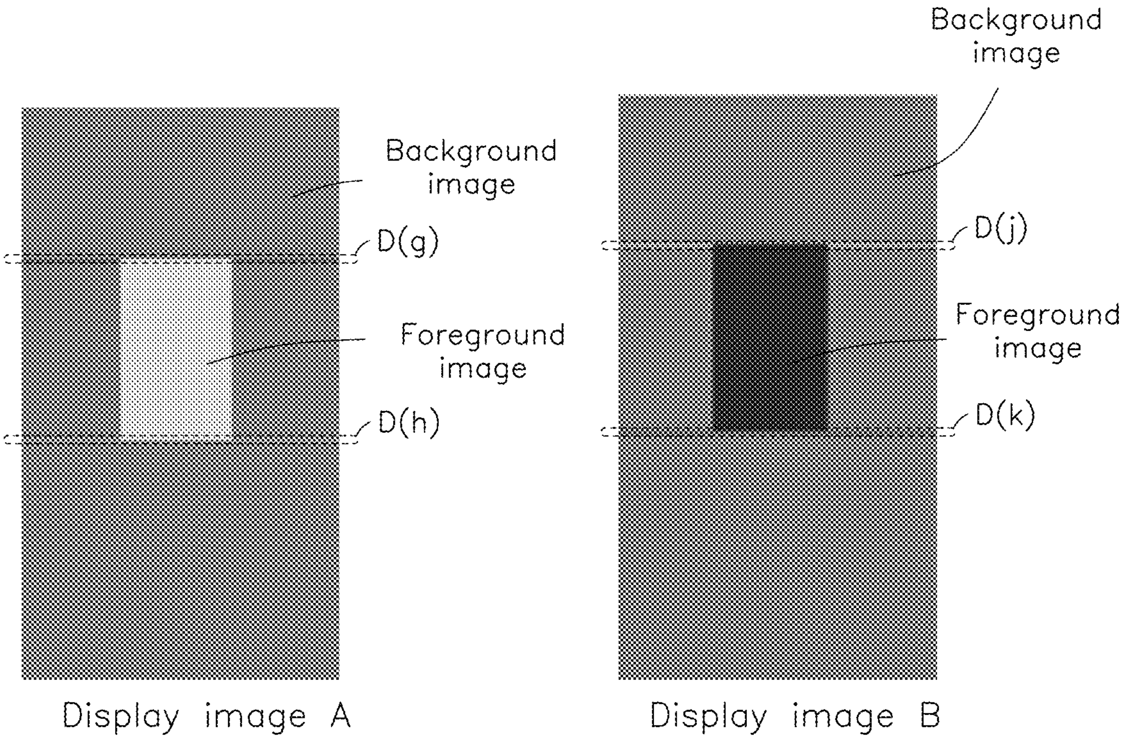
FIG. 3 is a diagram illustrating two display images, both of which have coupling defects, which have different foreground images according to the present application.

In detail, as shown in FIG. 3, FIG. 3 shows two display images having the coupling defect, which have different foreground images. The color of the foreground image of the display image A is white, and the color of the foreground image of the display image B is black. The specified condition 1 includes the color of the target data line to be white and the brightness change trend of the target data line and the data line previous the target data line from light to dark. The targe data line is the data line D(h) at a lower edge of the foreground image of the display image A. The specified condition 2 includes the color of the target data line to be white and the brightness change trend of the target data line and the data line previous the target data line from dark to light. The targe data line is the data line D(g) at a upper edge of the foreground image of the display image A. The specified condition 3 includes the color of the target data line to be black and the brightness change trend of the target data line and the data line previous the target data line from light to dark. The targe data line is the data line D(j) at a upper edge of the foreground image of the display image B. The specified condition 4 includes the color of the target data line to be black and the brightness change trend of the target data line and the data line previous the target data line from dark to light. The targe data line is the data line D(k) at a lower edge of the foreground image of the display image B. To a same bonding-point of the average brightness difference Delta_avg, the original compensation value under different specified conditions may be same or different, which may be adjusted based on a requirement.

The ratio value lookup table 12 stores a relationship between auxiliary data lines and the ratio values under different specified conditions. The ratio value of the target data line is greater than the ratio values of the auxiliary data lines. The farer distance between the auxiliary data lines and the target data line, the smaller ratio value of the auxiliary data lines is. The minimum ratio value may be 0. In one embodiment of the present application, there are eight auxiliary data lines, which is the data line in front of the targe data line and the seven data lines after the target data line. In other embodiments, the number and the positions of the auxiliary data lines may be adjusted according to different requirements. For example, the auxiliary data lines may include several data lines in front of the target data lines and several data lines after the target data lines, and also may include merely the data lines after the target data lines.

For example, as shown in a following ratio value lookup table 12, the ratio value lookup table 12 includes a relationship between eight auxiliary data lines and the ratio values under four specified conditions. In other embodiments, the ratio value lookup table 12 may define more or less bonding-points of the average brightness differences and specified conditions.

TABLE 12

Ratio value lookup table

| Auxiliary data line | Ratio value under the specified condition 1 | Ratio value under the specified condition 2 | Ratio value under the specified condition 3 | Ratio value under the specified condition 4 |
|---|---|---|---|---|
| D(i − 1) | 0.6 | 0.5 | 0.7 | 0.4 |
| D(i + 1) | 0.5 | 0.6 | 0.4 | 0.5 |
| D(i + 2) | 0.4 | 0.5 | 0.2 | 0.6 |
| D(i + 3) | 0.2 | 0.4 | 0.1 | 0.5 |
| D(i + 4) | 0.1 | 0.2 | 0.1 | 0.4 |
| D(i + 5) | 0 | 0.1 | 0.1 | 0.2 |
| D(i + 6) | 0 | 0.1 | 0.1 | 0.2 |
| D(i + 7) | 0 | 0.1 | 0 | 0.2 |

The trim value lookup table 13 stores a relationship between compensation data lines and the trim values under different specified conditions. The trim value may be a positive integer, or a negative integer. For example, as shown in a following trim value lookup table 13, the trim value lookup table 13 defines a relationship between nine compensation data lines and trim values under four specified conditions. The compensation data lines include the target data line and the auxiliary data lines. In other embodiments, the trim value lookup table 13 may define more or less auxiliary data lines and specified conditions.

TABLE 13

Trim value lookup table

| Auxiliary data line | Trim value under the specified condition 1 | Trim value under the specified condition 2 | Trim value under the specified condition 3 | Trim value under the specified condition 4 |
|---|---|---|---|---|
| D(i − 1) | 10 | −12 | 12 | −14 |
| D(i) | 8 | −5 | 8 | −7 |
| D(i + 1) | −70 | 70 | −60 | 60 |
| D(i + 2) | −70 | 80 | −40 | 40 |
| D(i + 3) | −56 | 60 | −30 | 30 |
| D(i + 4) | 0 | 20 | −10 | 0 |
| D(i + 5) | 0 | 10 | −10 | 0 |
| D(i + 6) | 0 | 0 | 0 | 0 |
| D(i + 7) | 0 | 0 | 0 | 0 |

The trim weight value lookup table 14 stores a relationship between the different bonding-points of the average brightness differences Delta_avg and the trim weight values under different specified conditions. For example, as shown in a following trim weight value lookup table 14, the trim weight value lookup table 14 defines a relationship between nine bonding-points of the average brightness differences Delta_avg and trim weight values under four specified conditions. In other embodiments, the trim weight value lookup table 14 may define more or less bonding-points of the average brightness differences and specified conditions.

TABLE 14

Trim weight value lookup table

| Bonding-point of Delta_avg | Trim weight value under the specified condition 1 | Trim weight value under the specified condition 2 | Trim weight value under the specified condition 3 | Trim weight value under the specified condition 4 |
|---|---|---|---|---|
| 0 | 0.2 | 0.3 | 0.1 | 0.3 |
| 32 | 0.3 | 0.5 | 0.2 | 0.4 |
| 64 | 0.5 | 0.7 | 0.4 | 0.4 |
| 96 | 0.7 | 0.6 | 0.6 | 0.5 |
| 128 | 0.8 | 0.4 | 0.7 | 0.6 |
| 160 | 0.8 | 0.9 | 0.8 | 0.6 |
| 192 | 0.8 | 0.9 | 0.8 | 0.6 |
| 224 | 1 | 1.2 | 0.9 | 0.9 |
| 256 | 1.2 | 1.3 | 0.9 | 0.9 |

The brightness weight value lookup table 15 stores a relationship between different bonding-points of the background brightness and the brightness weight values under different specified conditions. The background brightness is a brightness of a background image corresponding to the compensation data line. For example, as shown in a following brightness weight value table 15, the brightness weight value lookup table 15 defines nine bonding-points of the background brightness and the brightness weight values under four specified condition. In other embodiments, the brightness weight value lookup table 15 may define more or less bonding-points of the background brightness and specified conditions.

TABLE 15

Brightness weight value lookup table

| Bonding-points of background brightness | Brightness weight value under the specified condition 1 | Brightness weight value under the specified condition 2 | Brightness weight value under the specified condition 3 | Brightness weight value under the specified condition 4 |
|---|---|---|---|---|
| 0 | 0.3 | 0.4 | 0.5 | 0.1 |
| 32 | 0.5 | 0.6 | 0.3 | 0.2 |
| 64 | 0.7 | 0.8 | 0.3 | 0.4 |
| 96 | 0.6 | 1 | 0.6 | 0.6 |
| 128 | 0.4 | 1 | 0.9 | 0.7 |
| 160 | 0.9 | 1.2 | 1.2 | 0.8 |
| 192 | 1 | 1.3 | 1.2 | 1 |
| 224 | 1.2 | 1.6 | 1.5 | 1.6 |
| 256 | 1.2 | 1.8 | 1.7 | 1.5 |

The processor 20 may include one or more micro processor, or digital processor. The processor 20 may be a central processing unit (CPU), or a larger scale integrated circuit, being an operation core and a control core. The processor 20 may be used to run the computer programs stored in the storage medium 10 to implement related functions. The processor 20 may run the computer programs stored in the storage medium 10 to implement the display driving method.

The processor 20 includes a data line detection module 21, a compensation parameter calculating module 22, a trim parameter calculating module 23, and a brightness calculating module 24.

The data line detection module 21 is configured to calculate an average brightness of each of the data lines $D_1$-$D_m$ of the display image and an average brightness difference corresponding to each of the data lines $D_1$-$D_m$. The data line detection module 21 further determines whether the average brightness difference of a current data line D(i) of the data lines $D_1$-$D_m$ is greater than a predefined threshold value. In one embodiment, the average brightness difference is a difference of the average brightness of the current data line D(i) and the previous data line D(i−1) in front of the current data line D(i). When the average brightness difference of the current data line D(i) is greater than the predefined threshold value, there is a coupling defect in the current data line D(i), the data line detection module 21 sets the current data line D(i) as a target data line, and sets several data lines of the data lines D(1)-D(m) adjacent to the target data line as the auxiliary data lines. The target data line and the auxiliary data lines are served as the compensation data lines. When the average brightness difference of the current data line D(i) is smaller than or equal to the predefined threshold value, there is no coupling defect in the current data line D(i), the current data line D(i) does not need to compensated. In one embodiment, there are eight auxiliary data lines, which include a data line of the data lines D(1)-D(m) in front of the targe data line and the seven data lines of the data lines D(1)-D(m) after the target data line. In other embodiments, the number and the positions of the auxiliary data lines may be adjusted according to different requirements. For example, the auxiliary data lines may include several data lines of the data lines D(1)-D(m) in front of the target data line and several data lines of the data lines D(1)-D(m) after the target data line, and also may include merely the data lines of the data lines D(1)-D(m) after the target data line.

The compensation parameter calculating module 22 is electrically connected to the data line detection module 21. The compensation parameter calculating module 22 is configured to calculate compensation parameters of each of the compensation data lines. In one embodiment, the compensation parameters include an original compensation value, a ratio value, and a background brightness weight value. The display image includes at least one foreground image and at least one background image.

In detail, the compensation parameter calculating module 22 confirms an average brightness difference interval, where the average brightness difference is located in, by a table lookup operation in the original compensation value lookup table 11 based on the average brightness difference of the target data line and the specified condition corresponding to the target data line. The compensation parameter calculating module 22 further calculates an original compensation value of the target data line by a linearly interpolating operation based on two binding-point average brightness difference values of the confirmed average brightness difference interval. The specified condition includes a color of the current data line D(i) and a brightness change trend between the current data line D(i) and the previous data line D(i−1). In one embodiment, as shown in FIG. 3, the specified condition 1 includes the color of the target data line to be white and the brightness change trend of the target data line and the data line previous the target data line from light to dark. The targe data line is the data line D(h) at a lower edge of the foreground image of the display image A. The specified condition 2 includes the color of the target data line to be white and the brightness change trend of the target data line and the data line previous the target data line from dark to light. The targe data line is the data line D(g) at a upper edge of the foreground image of the display image A. The specified condition 3 includes the color of the target data line to be black and the brightness change trend of the target data line and the data line previous the target data line from light to dark. The targe data line is the data line D(j) at a upper edge of the foreground image of the display image B. The specified condition 4 includes the color of the target data line to be black and the brightness change trend of the target data line and the data line previous the target data line from dark to light. The targe data line is the data line D(k) at a lower edge of the foreground image of the display image B.

The compensation parameter calculating module 22 further obtains a ratio value of each of the auxiliary data lines by a table lookup operation in the ratio value lookup table 12 based on a position of each of the auxiliary data lines related to the target data line. The ratio value of the target data line is greater than the ratio values of the auxiliary data lines. The farer distance between the auxiliary data lines and the target data line, the smaller ratio value of the auxiliary data lines is. The minimum ratio value may be 0.

Figure 4:
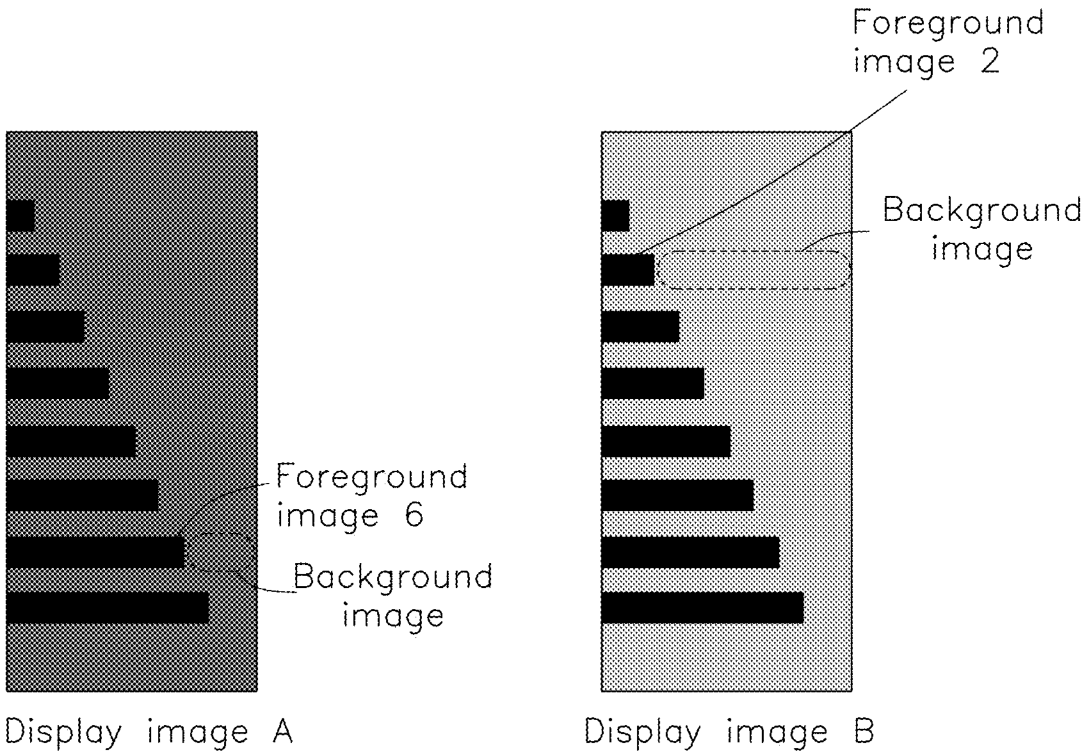
FIG. 4 is a diagram illustrating different display images with a same average brightness difference according to the present application.

While compensating the compensation data lines, the brightness of the background image corresponding to each of the compensation data lines needs to be considered. In that means, when the compensation data lines have the same average brightness difference, but the background images are different, a compensation value of the compensation data line is further adjusted based on the brightness of the background image corresponding to the compensation data line. As shown in FIG. 4, the average brightness difference of the target data line on an upper and/or a lower edge of the foreground image 6 in display image A is 163, and the brightness of the corresponding background image is 68. The average brightness difference of the target data line on an upper and/or a lower edge of the foreground image 2 in display image B is 163, and the brightness of the corresponding background image is 204. On a visual effect, due to the display image B with the greater brightness of the background image, the coupling defect at the target data line is more obvious. Therefore, the compensation value of the target data line in the display image B is greater. Therefore, the compensation calculating module 22 further calculates the background brightness weight value.

In detail, the compensation calculating module 22 further confirms a background brightness interval of each of the compensation data lines by a table lookup operation in the brightness weight value lookup table 15 based on the brightness of each of the compensation data lines and the specified condition corresponding to the target data line. The compensation calculating module 22 further calculates a brightness weight value of each of the compensation data lines by a linearly interpolating operation based on two binding-point background of the obtained background brightness interval.

The trim parameter calculating module 23 is electrically connected with the data line detection module 21. The trim parameter calculating module 23 is configured to calculate trim parameters of each of the compensation data lines. In one embodiment, the trim parameters include a trim value and a trim weight value.

In detail, the trim parameter calculating module 23 determines whether there is inversion phenomenon existed in the auxiliary data lines. In one embodiment, as shown in FIG. 3, when the display image B with a black foreground image exists the coupling defect, the auxiliary data lines below the lower edge of the black foreground image are supposed to be the white lines. When at least one of the auxiliary data lines is the black line, the inversion phenomenon exists in the auxiliary data lines.

When there is inversion phenomenon existed in the auxiliary data lines, the trim parameter calculating module 23 obtains the trim values corresponding to the auxiliary data lines and the target data line respectively by a table lookup operation in the trim value lookup table 13 based on a position of each of the auxiliary data lines related to the target data line and the specified condition corresponding to the target data line. In one embodiment, the trim value of the target data line is not 0.

The trim parameter calculating module 23 further confirms the trim weight interval by a table lookup operation in the trim weight value lookup table 14 based on the average brightness of the auxiliary data lines and the specified condition corresponding to the target data line. The parameter calculating module 23 further obtains the corresponding trim weight value of each of the auxiliary data lines by a linearly interpolating operation based on two binding-point trim weight values of the obtained trim weight interval.

When there is no inversion phenomenon existed in the auxiliary data lines, the trim parameter calculating module 23, the trim parameter calculating module 23 sets the trim value of each of the compensation data line at 0.

The brightness calculating module 24 is electrically connected with the compensation calculating module 22 and the trim parameter calculating module 23. The brightness calculating module 24 is configured to calculate an output brightness of each of the compensation data lines based on an original brightness, the calculated compensation parameters, and the calculated trim parameters of each of the compensation data lines. The brightness calculating module 24 further outputs the calculated output brightness to the data driving circuit 100.

In one embodiment, the brightness calculating module 24 calculates the compensation brightness of each of the compensation data line by the following formula 1.

$$B\_final(i) = B\_org(i) + (C\_target \times R(i) + T(i) \times W\_a(i)) \times W\_b(i) \quad \text{Formular 1}$$

Wherein, B_final(i) represents the outputted brightness of the compensation data line, B_org(i) represents the original brightness of the compensation data line, C_target represents the original compensation value of the target data line, R(i) represents the ratio of the compensation data line, T(i) represents the trim value of the compensation data line, W_a(i) represents the trim weight value of the compensation data line, W_b(i) represents the brightness weight value of the compensation data line.

The brightness calculating module 24 controls a difference ratio between a brightness of the background image corresponding to each of the compensation data lines and a brightness of the background image corresponding to other data lines of the data lines to be less than a predefined ratio value. In one embodiment, the difference ratio is calculated by the following formula 2.

$$Ratio = (B\_background - B\_boundry)/B\_background \quad \text{Formula 2}$$

Wherein, Ratio represents the difference ratio, B_background represents the brightness of the background image corresponding to any one of other data lines of the data lines, B_boundary represents the brightness of the boundary image corresponding to the compensation data line.

Based on the foregoing display apparatus 1, the target data line and the auxiliary data lines adjacent the target data line are compensated while there is coupling defect in the display image, for reducing the interference related to the data lines, a quality of the display image and the users usage experience are improved.

Figure 5:
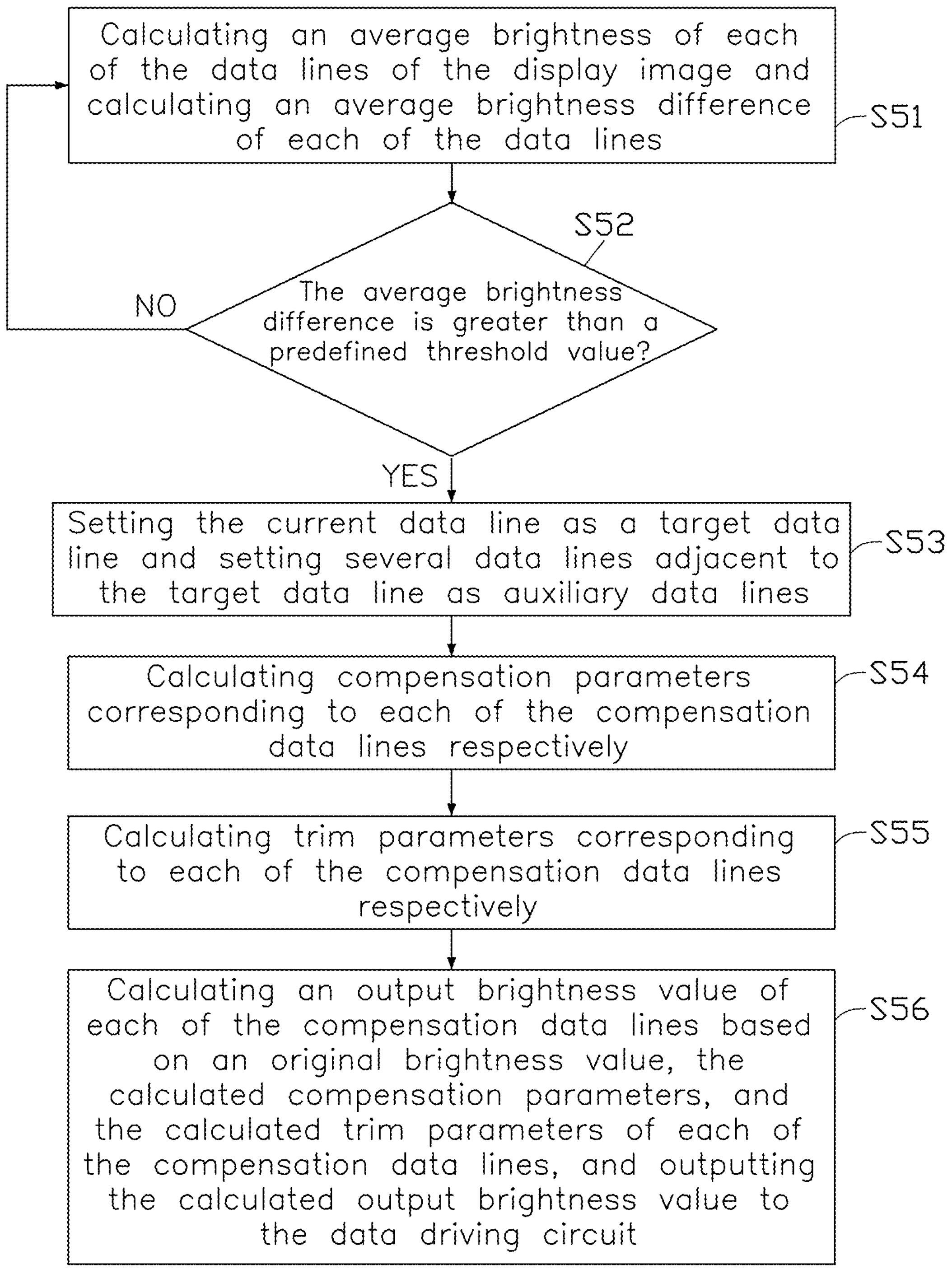
FIG. 5 is a flowchart illustrating an embodiment of a display driving method of according to the present application.

Referring to FIG. 5, FIG. 5 shows a flowchart of a display driving method. In one embodiment, the display driving method is used in the display apparatus 1. In one embodiment, the display apparatus 1 may include more or fewer components than those shown in the figure, or combine some components, or split some components, or have different component arrangement. The display driving method includes the following steps.

In block S51, an average brightness of each of the data lines D(1)-D(m) of the display image and an average brightness difference corresponding to each of the data lines D(1)-D(m) are calculated.

In one embodiment, the average brightness difference is a difference of the average brightness of the current data line D(i) and the previous data line D(i−1) in front of the current data line D(i).

In block S52, determining whether the average brightness difference of a current data line D(i) of the data lines D(1)-D(m) is greater than a predefined threshold value.

In block S53, when the average brightness difference of the current data line D(i) is greater than the predefined threshold value, the current data line D(i) is set as a target data line, and several data lines of the data lines D(1)-D(m) adjacent to the target data line are set as the auxiliary data lines.

In one embodiment, the target data line and the auxiliary data lines are served as the compensation data lines.

In one embodiment, the target data line is one of the data lines D(1)-D(m), the brightness of which is larger than the predefined threshold value. In one embodiment, there are eight auxiliary data lines, which include a data line of the data lines D(1)-D(m) in front of the targe data line and the seven data lines of the data lines D(1)-D(m) after the target data line. In other embodiments, the number and the positions of the auxiliary data lines may be adjusted according to different requirements. For example, the auxiliary data lines may include several data lines of the data lines D(1)-D(m) in front of the target data line and several data lines of the data lines D(1)-D(m) after the target data line, and also may include merely the data lines of the data lines D(1)-D (m) after the target data line.

When the average brightness difference of the current data line D(i) is less than or equal to the predefined threshold value, the procedure returns to the block S51.

In block S54, compensation parameters of each of the compensation data lines are calculated.

In one embodiment, the compensation parameters include an original compensation value, a ratio value, and a background brightness weight value. The display image includes at least one foreground image and at least one background image.

Figure 6:
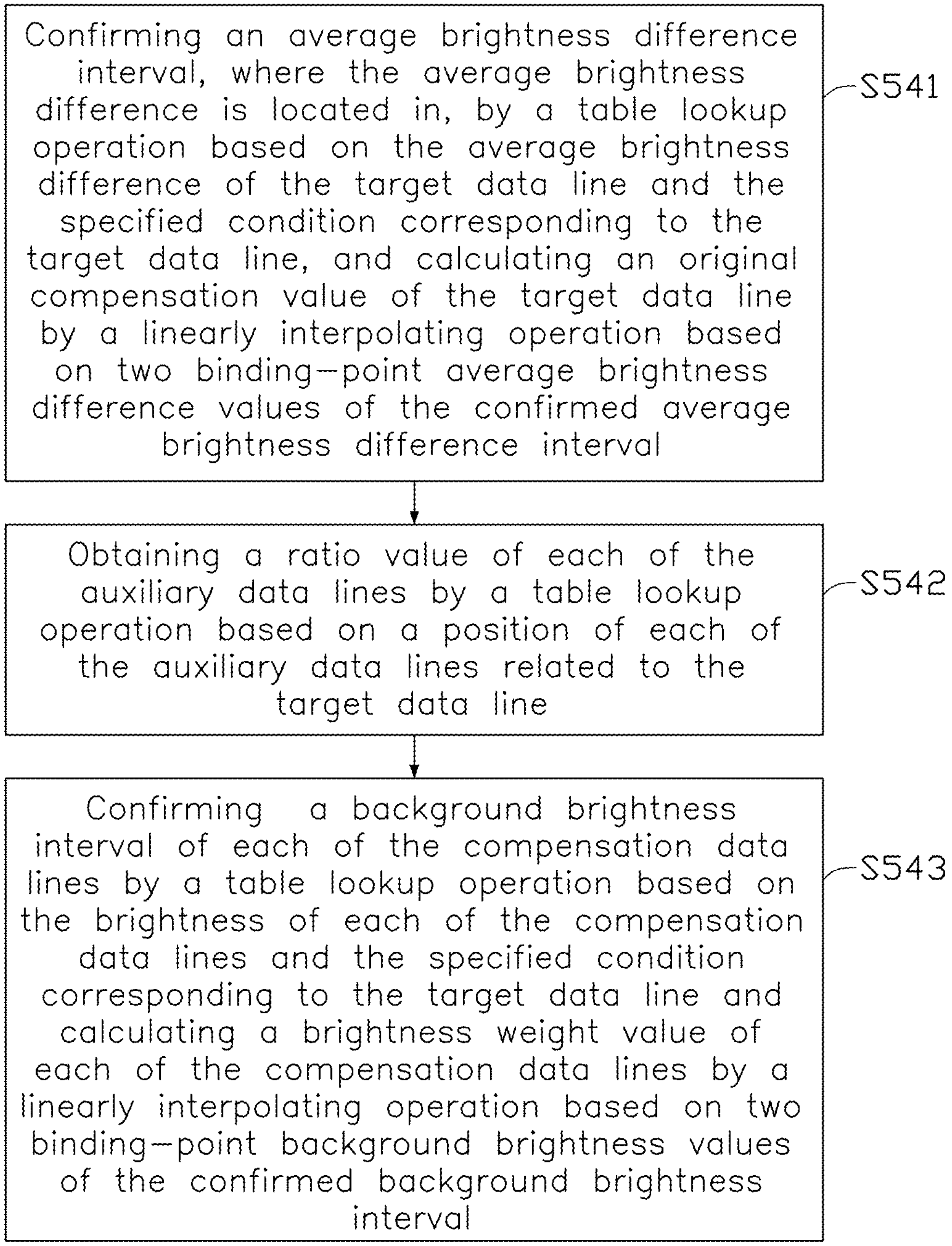
FIG. 6 is a detail flowchart illustrating an embodiment of block S54 of the flowchart in FIG. 5 according to the present application.

Referring to FIG. 6, FIG. 6 shows a detail flowchart of the block S54.

In block S541, an average brightness difference interval, where the average brightness difference is located in, is confirmed by a table lookup operation based on the average brightness difference of the target data line and the specified condition corresponding to the target data line, an original compensation value of the target data line by a linearly interpolating operation based on two binding-point average brightness difference values of the confirmed average brightness difference interval is calculated.

The target data line under different specified conditions corresponds to different original compensation value. The specified condition includes the color of the target data line and a brightness change trend between the target data line and the previous data line in front of the target data line. In one embodiment, as shown in FIG. 3, FIG. 3 shows two display images having the coupling defect, which have different foreground images. The color of the foreground image of the display image A is white, and the color of the foreground image of the display image B is black. The specified condition 1 includes the color of the target data line to be white and the brightness change trend of the target data line and the data line previous the target data line from light to dark. The targe data line is the data line D(h) at a lower edge of the foreground image of the display image A. The specified condition 2 includes the color of the target data line to be white and the brightness change trend of the target data line and the data line previous the target data line from dark to light. The targe data line is the data line D(g) at a upper edge of the foreground image of the display image A. The specified condition 3 includes the color of the target data line to be black and the brightness change trend of the target data line and the data line previous the target data line from light to dark. The targe data line is the data line D(j) at a upper edge of the foreground image of the display image B. The specified condition 4 includes the color of the target data line to be black and the brightness change trend of the target data line and the data line previous the target data line from dark to light. The targe data line is the data line D(k) at a lower edge of the foreground image of the display image B.

In one embodiment, the average brightness interval is confirmed by a table lookup operation in the original compensation lookup table 11.

In block S542, a ratio value of each of the auxiliary data lines is obtained by a table lookup operation based on a position of each of the auxiliary data lines related to the target data line.

In one embodiment, the ratio value is obtained by the table lookup operation in the ratio value lookup table 12.

In block S543, a background brightness interval of each of the compensation data lines is confirmed by a table lookup operation based on the brightness of each of the compensation data lines and the specified condition corresponding to the target data line, and a brightness weight value of each of the compensation data lines is calculated by a linearly interpolating operation based on two binding-point background of the obtained background brightness interval.

In one embodiment, the background brightness interval is confirmed by the table lookup operation in the brightness weight value lookup table 15.

In block S55, trim parameters of each of the compensation data lines are calculated.

The trim parameters include a trim value and a trim weight value.

Figure 7:
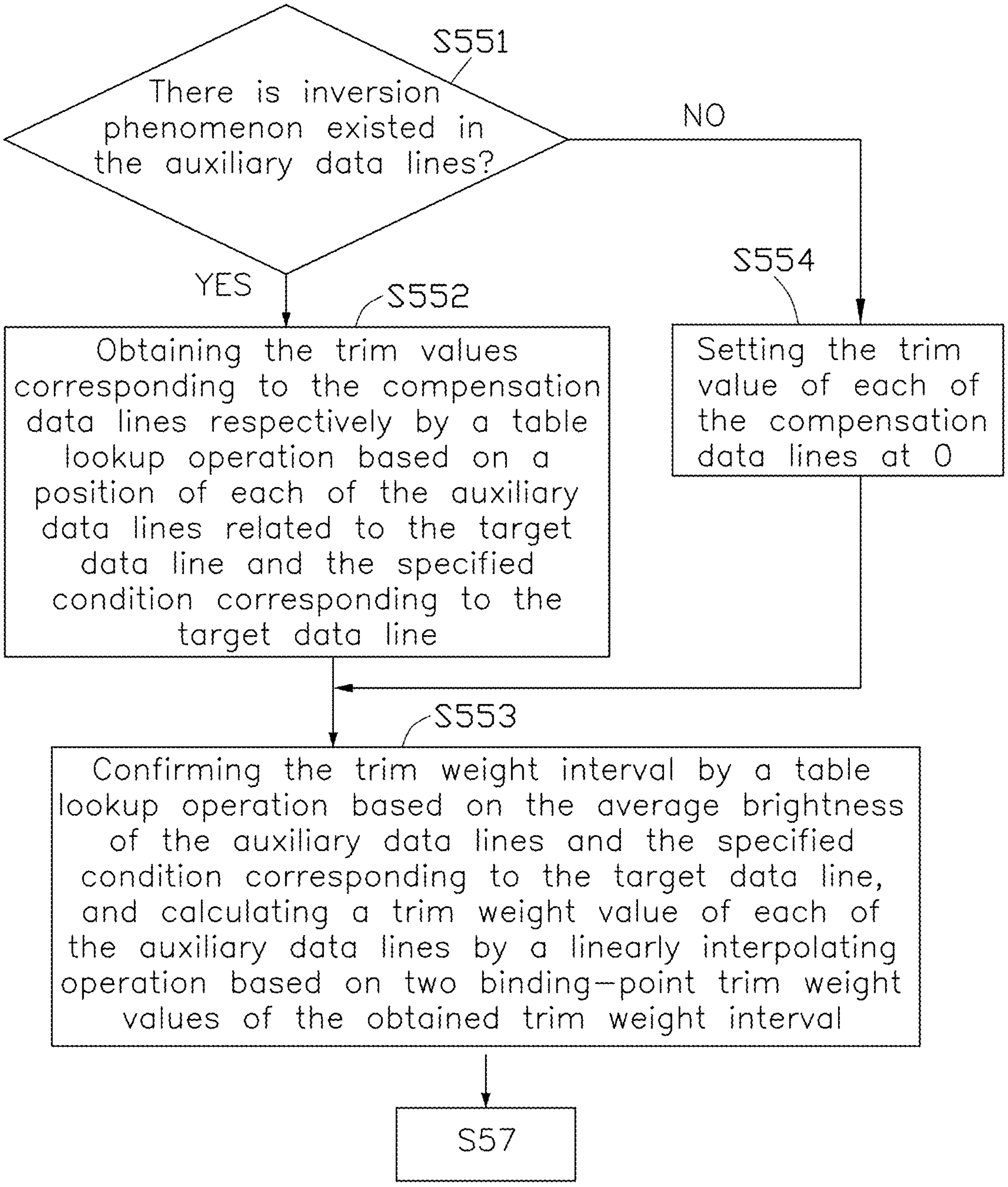
FIG. 7 is a detail flowchart illustrating an embodiment of block S55 of the flowchart in FIG. 5 according to the present application.

Referring to FIG. 7, FIG. 7 shows the detail flowchart of the block S55.

In block S551, determining whether there is inversion phenomenon existed in the auxiliary data lines.

In one embodiment, as shown in FIG. 3, when the display image B with a black foreground image exists the coupling defect, the auxiliary data lines below the lower edge of the black foreground image are supposed to be the white lines. When at least one of the auxiliary data lines is the black line, the inversion phenomenon exists in the auxiliary data lines.

In block S552, when there is inversion phenomenon existed in the auxiliary data lines, the trim values corresponding to the compensation data lines respectively is obtained by a table lookup operation based on a position of each of the auxiliary data lines related to the target data line and the specified condition corresponding to the target data line.

In one embodiment, the trim value corresponding to the target data line is not 0, the trim values are obtained by the table lookup operation in the trim value lookup table 13. The trim value corresponding to the auxiliary lines, where the inversion phenomenon existed, is a negative value.

In block S553, the trim weight interval is confirmed by a table lookup operation based on the average brightness of the auxiliary data lines and the specified condition corresponding to the target data line, and trim weight value of each of the auxiliary data lines is calculated by a linearly interpolating operation based on two binding-point trim weight values of the obtained trim weight interval.

In one embodiment, the trim weight interval is confirmed by the table lookup operation in the trim weight value lookup table 14.

In block S554, when there is no inversion phenomenon existed in the auxiliary data lines, the trim values of the compensation data lines are set at 0.

The trim values of the target data line and the auxiliary data lines are set at 0.

In block S56, an output brightness of each of the compensation data lines based on an original brightness, the calculated compensation parameters, and the calculated trim parameters of each of the compensation data lines, the calculated output brightness is outputted to the data driving circuit 100.

In one embodiment, the output brightness is calculated by the following formula 1.

$$B\_final(i) = B\_org(i) + (C\_target \times R(i) + T(i) \times W\_a(i)) \times W\_b(i) \quad \text{Formular 1}$$

Wherein, B_final(i) represents the outputted brightness of the compensation data line, B_org(i) represents the original brightness of the compensation data line, C_target represents the original compensation value of the target data line, R(i) represents the ratio of the compensation data line, T(i) represents the trim value of the compensation data line, W_a(i) represents the trim weight value of the compensation data line, W_b(i) represents the brightness weight value of the compensation data line.

Based on the foregoing display driving method, the target data line and the auxiliary data lines adjacent the target data line are compensated while there is coupling defect in the display image, for reducing the interference related to the data lines, a quality of the display image and the users usage experience are improved.

It should be noted that, for brief description, the foregoing method embodiments are represented as a series of action combinations. However, persons skilled in the art should understand that this application is not limited to the described action sequence, because some steps may be performed in other sequences or simultaneously according to this application. It should be further appreciated by persons skilled in the art that embodiments described in this specification all belong to example embodiments, and the related actions and modules are not necessarily required by this application.

In the several embodiments provided in this application, it should be understood that the disclosed apparatus may be implemented in other manners. For example, the described apparatus embodiment is merely an example. For example, division into the modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions of embodiments.

In addition, functional modules in embodiments of this application may be integrated into one processing module, or each of the modules may exist alone physically, or two or more modules are integrated into one module. The integrated module may be implemented in a form of hardware, or may be implemented in a form of a software functional module. When the foregoing integrated module is implemented in the form of a software functional module and sold or used as an independent product, the integrated module may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for instructing a computer device (which may be a personal computer, a server, or a network device, and may specifically be a processor in a computer device) to perform all or a part of the steps of the foregoing methods described in embodiments of this application.

It also should be noted that, in the embodiments of this application, a term "include" or any other variant thereof is intended to cover a non-exclusive inclusion, so that a process, a method, an article, or a device that includes a series of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

The foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A display driving method, applied in a display apparatus configured to display a display image, the display apparatus comprising a plurality of scan lines and a plurality of data lines driven by a data driving circuit, the display driving method comprising:

calculating an average brightness of each of the plurality of data lines of the display image and calculating an average brightness difference of each of the plurality of data lines;

determining whether the average brightness difference of a current data line of the plurality of the data lines is greater than a predefined threshold value;

in response to that the average brightness difference of the current data line is determined greater than a predefined threshold value, setting the current data line as a target data line and setting several data lines of the plurality of data lines adjacent to the target data line as auxiliary data lines, and serving the target data line and the auxiliary data lines as compensation data lines;

calculating compensation parameters corresponding to each of the compensation data lines respectively;

calculating trim parameters corresponding to each of the compensation data lines respectively; and calculating an output brightness value of each of the compensation data lines based on an original brightness value, the calculated compensation parameters, and the calculated trim parameters of each of the compensation data lines, and outputting the calculated output brightness to the data driving circuit;

wherein the compensation parameters comprise an original compensation value and a ratio value; the calculating the compensation parameters corresponding to each of the compensation data lines respectively comprises:

confirming an average brightness difference interval, where the average brightness difference is located in, by a table lookup operation based on the average brightness difference of the target data line and the specified condition corresponding to the target data line, and calculating an original compensation value of the target data line by a linearly interpolating operation based on two binding-point average brightness difference values of the confirmed average brightness difference interval; and obtaining the ratio value of each of the auxiliary data lines by a table lookup operation based on a position of each of the auxiliary data lines related to the target data line.

2. The display driving method of claim 1, wherein the compensation parameters further comprises a background brightness weight value; after the obtaining the ratio value of each of the auxiliary data lines by a table lookup operation based on a position of each of the auxiliary data lines related to the target data line, the method further comprises:

confirming a background brightness interval of each of the compensation data lines by a table lookup operation based on the brightness of each of the compensation data lines and the specified condition corresponding to the target data line and calculating a brightness weight value of each of the compensation data lines by a linearly interpolating operation based on two binding-point background brightness values of the confirmed background brightness interval.

3. The display driving method of claim 1, wherein the trim parameters comprises a trim value and a trim weight value; the calculating the trim parameters corresponding to each of the compensation data lines respectively comprises:

determining whether there is inversion phenomenon existed in the auxiliary data lines;

when there is inversion phenomenon existed in the auxiliary data lines, obtaining the trim values corresponding to the compensation data lines respectively by a table lookup operation based on a position of each of the auxiliary data lines related to the target data line and the specified condition corresponding to the target data line; the trim value corresponding to the target data line is not 0; and confirming a trim weight interval by a table lookup operation based on the average brightness of the auxiliary data lines and the specified condition corresponding to the target data line, and calculating a trim weight value of each of the auxiliary data lines by a linearly interpolating operation based on two binding-point trim weight values of the obtained trim weight interval.

4. The display driving method of claim 3, wherein the calculating the trim parameters corresponding to each of the compensation data lines respectively further comprises:

when there is no inversion phenomenon existed in the auxiliary data lines, setting the trim values of the compensation data lines at 0.

5. The display driving method of claim 1, wherein the output brightness is calculated according to the following formula; $B\_final(i)=B\_org(i)+(C\_target\times R(i)+T(i)\times W\_a(i))\times W\_b(i)$; wherein B_final(i) represents the outputted brightness of the compensation data line, B_org(i) represents the original brightness of the compensation data line, C_target represents the original compensation value of the target data line, R(i) represents the ratio of the compensation data line, T(i) represents the trim value of the compensation data line, W_a(i) represents the trim weight value of the compensation data line, W_b(i) represents the brightness weight value of the compensation data line.

6. The display driving method of claim 1, wherein the auxiliary data lines comprises a data line of the data lines in front of the targe data line and several data lines of the plurality of the data lines after the target data line.

7. The display driving method of claim 1, wherein the display image comprises at least one background image; a difference ratio between a brightness of the background image corresponding to each of the compensation data lines and a brightness of the background image corresponding to other data lines of the plurality of data lines is less than a predefined ratio value.

8. The display driving method of claim 7, wherein the difference ratio is calculated by the following formula;

Ratio=(B_background-B_boundary)/B_background;

wherein Ratio represents the difference ratio, B_background represents the brightness of the background image corresponding to any one of other data lines of the plurality of data lines, B_boundary represents the brightness of the boundary image corresponding to one of the compensation data lines.

9. A display apparatus configured to display a display image, and comprising a plurality of scan lines; a plurality of data lines driven by a data driving circuit; a storage medium storing several lookup tables; and a processor comprising:

a data line detection module, configured to calculate an average brightness of each of the plurality of data lines of the display image, calculate an average brightness difference of each of the plurality of data lines, determine whether the average brightness difference of a current data line of the plurality of the data lines is greater than a predefined threshold value; wherein when the average brightness difference of the current data line is greater than a predefined threshold value, the data line detection module sets the current data line as a target data line and sets several data lines of the plurality of data lines adjacent to the target data line as auxiliary data lines; the data line detection module further serves the target data line and the auxiliary data lines as compensation data lines;

a compensation parameter calculating module, electrically connected to the data line detection module, the compensation parameter calculating module configured to calculate compensation parameters corresponding to each of the compensation data lines respectively;

a trim parameter calculating module, electrically connected to the data line detection module, the trim parameter calculating module configured to calculate trim parameters corresponding to each of the compensation data lines respectively; and a brightness calculating module, electrically connected to the compensation parameter calculating module and the trim parameter calculating module; the brightness calculating module configured to calculate an output brightness value of each of the compensation data lines based on an original brightness value, the calculated compensation parameters, and the calculated trim parameters of each of the compensation data lines, and output the calculated output brightness to the data driving circuit;

wherein the compensation parameters comprises an original compensation value and a ratio value; the display image comprises at least one foreground image and at least one background image; the compensation parameter calculating module further confirms an average brightness difference interval, where the average brightness difference is located in, by a table lookup operation based on the average brightness difference of the target data line and the specified condition corresponding to the target data line, and calculating an original compensation value of the target data line by a linearly interpolating operation based on two binding-point average brightness difference values of the confirmed average brightness difference interval; the compensation parameter calculating module further obtains the ratio value of each of the auxiliary data lines by a table lookup operation based on a position of each of the auxiliary data lines related to the target data line.

10. The display apparatus of claim 9, wherein the compensation parameters further comprises a background brightness weight value; the compensation parameter calculating module further confirms a background brightness interval of each of the compensation data lines by a table lookup operation based on the brightness of each of the compensation data lines and the specified condition corresponding to the target data line; the compensation parameter calculating module further calculates a brightness weight value of each of the compensation data lines by a linearly interpolating operation based on two binding-point background brightness values of the confirmed background brightness interval.

11. The display apparatus of claim 9, wherein the trim parameters comprises a trim value and a trim weight value; the trim parameters calculating module further determines whether there is inversion phenomenon existed in the auxiliary data lines; when there is inversion phenomenon existed in the auxiliary data lines, the trim parameters calculating module further obtains the trim values corresponding to the compensation data lines respectively by a table lookup operation based on a position of each of the auxiliary data lines related to the target data line and the specified condition corresponding to the target data line; the trim value corresponding to the target data line is not 0; the trim parameters calculating module further confirms a trim weight interval by a table lookup operation based on the average brightness of the auxiliary data lines and the specified condition corresponding to the target data line; the trim parameters calculating module further calculates a trim weight value of each of the auxiliary data lines by a linearly interpolating operation based on two binding-point trim weight values of the obtained trim weight interval.

12. The display apparatus of claim 11, wherein when there is no inversion phenomenon existed in the auxiliary data lines, the trim parameters calculating module sets the trim values of the compensation data lines at 0.

13. The display apparatus of claim 9, wherein the output brightness is calculated according to the following formula;

B_final(i)=B_org(i)+(C_target×R(i)+T(i)×W_a(i))×W_b(i);

wherein B_final(i) represents the outputted brightness of the compensation data line, B_org(i) represents the original brightness of the compensation data line, C_target represents the original compensation value of the target data line, R(i) represents the ratio of the compensation data line, T(i) represents the trim value of the compensation data line, W_a(i) represents the trim weight value of the compensation data line, W_b (i) represents the brightness weight value of the compensation data line.

14. The display apparatus of claim 9, wherein the auxiliary data lines comprises a data line of the data lines in front of the targe data line and several data lines of the plurality of the data lines after the target data line.

15. The display apparatus of claim 9, wherein the display image comprises at least one background image; a difference ratio between a brightness of the background image corresponding to each of the compensation data lines and a brightness of the background image corresponding to other data lines of the plurality of data lines is less than a predefined ratio value.

16. The display apparatus of claim 15, wherein the difference ratio is calculated by the following formula;

Ratio=(B_background-B_boundary)/B_background;

wherein Ratio represents the difference ratio, B_background represents the brightness of the background image corresponding to any one of other data lines of the plurality of data lines, B_boundary represents the brightness of the boundary image corresponding to one of the compensation data lines.

* * * * *